United States Patent [19]
Carpenter et al.

[11] Patent Number: 5,337,633
[45] Date of Patent: Aug. 16, 1994

[54] ARRANGEMENT AND METHOD OF USE OF COOPERATIVE BLADES FOR SEVERING COATING LAYERS ON FILAMENTARY MEMBERS

[75] Inventors: Thomas S. Carpenter; David D. Hand, both of Cazenovia, N.Y.

[73] Assignee: Carpenter Manufacturing Co., Inc., Manlius, N.Y.

[21] Appl. No.: 115,875

[22] Filed: Sep. 1, 1993

[51] Int. Cl.$^5$ .................. H02G 1/12; H01R 43/28
[52] U.S. Cl. ........................... 81/9.51; 29/828
[58] Field of Search ............ 81/9.4, 9.51; 29/825, 29/828; 83/693, 924, 947

[56] References Cited

U.S. PATENT DOCUMENTS

| | | | |
|---|---|---|---|
| 2,844,056 | 7/1958 | Sladek | 81/9.51 |
| 3,403,441 | 10/1968 | Eubanks | 81/9.51 |
| 4,104,012 | 8/1978 | Ferrante | 81/9.51 |
| 4,784,024 | 11/1988 | Butler | 81/9.51 |
| 4,802,512 | 2/1989 | Kodera | 81/9.51 |
| 4,852,433 | 8/1989 | Butler | 81/9.51 |
| 5,025,687 | 6/1991 | Butler | 81/9.51 |
| 5,067,379 | 11/1991 | Butler et al. | |

FOREIGN PATENT DOCUMENTS 0292089 11/1988 European Pat. Off. ............ 81/9.51

*Primary Examiner*—Roscoe V. Parker
*Attorney, Agent, or Firm*—Charles S. McGuire

[57] ABSTRACT

Apparatus for severing and stripping a portion of a coating material from an elongated member such as an insulated electrical conductor, or the like, utilizing a pair of overlapping blades having cutting edges formed at the junction of two planar surfaces meeting at an acute angle. The blades are moved relative to one another, radially of the conductor, to cause the cutting edges to move radially partially through the layer of insulation. Relative movement of the blades and conductor axially of the conductor completes the severing of a slug of insulation, all in accordance with the prior art. The present apparatus is distinguished by making the planar surface portions immediately adjacent the cutting edges of the overlapping blades and engaged with the portion of the insulation to be stripped, i.e., the portions of the blades which apply the axial severing force, at equal angles, either 90° or an acute angle, to the direction of relative movement. The disclosure is also embodied in the method of cutting and severing a slug of coating material in the foregoing manner.

36 Claims, 2 Drawing Sheets

ARRANGEMENT AND METHOD OF USE OF COOPERATIVE BLADES FOR SEVERING COATING LAYERS ON FILAMENTARY MEMBERS

BACKGROUND OF THE INVENTION

The present invention relates to apparatus having a pair of overlapping blades for cutting partially through one or more layers of material surrounding an elongated, filamentary member, and then severing the material at the position of the cuts by moving the blades axially of the member while restraining the latter against axial movement, or by maintaining the blades stationary and moving the member axially with respect thereto. More specifically, the invention relates to novel configurations and arrangements of the blades used in apparatus of the foregoing type to provide improved operation, particularly when operating upon members of relatively large diameter.

The prior art contains many examples of manually, semi-automatically and automatically operated apparatus for severing layers of material which cover elongated, filamentary members for the purpose of exposing an end portion or intermediate part of such member. In one widely used application, a layer of insulation is cut, severed and stripped from a free end of an electrical wire. Such apparatus is also used for removing coating layers from selected portions of optical fibers, coaxial cable, flat ribbon cable, etc. Although it will be understood that the present invention is suitable for use in all analogous operations, it will be explained and hereinafter referred to in the context of severing and stripping a single layer of insulating material from a free end portion of an electrical wire.

While some severing and stripping apparatus has used only a single cutting blade which is moved around the wire, it is far more common to employ a plurality of blades to cut the insulation. In any case, the blade or blades are mounted for reciprocating movement of the cutting edge(s) radially of the wire or other elongated member. When two or more blades are used in such operations, they may be mounted with the cutting edges in direct opposition, i.e., in the same plane perpendicular to the axis of the wire, such as in the various embodiments of cutting and stripping apparatus disclosed in U.S. Pat. Nos. 4,993,147 and 4,993,287, both issued Feb. 19, 1991 and assigned to applicants' assignee. Since at least portions of the opposing edges of blades mounted in this manner are in mutual, abutting relation when the blades are moved toward one another to the limit of their movement, they will be termed "abutting blades."

In some apparatus of this type, it has been found convenient to mount the blades with opposing surface portions in superposed, sliding contact as the blades are moved reciprocally relative to one another and radially of a wire positioned therebetween with its axis perpendicular to the blade cutting edges. The prior art includes numerous examples of cutting and stripping apparatus with blades arranged in this manner. Since portions of such blades are in mutually overlapping relation, they are termed "overlapping blades, " as distinguished from abutting blades The cutting edges of overlapping blades are usually formed along the edges of notches, e.g., of V-shaped configuration, in one side of the blades.

The cutting edges of both types of blades are normally formed at the juncture of two essentially planar surface portions meeting at an acute angle to form a sharp edge. The plane of at least one of the planar surfaces forming the cutting edge(s) also intersects the axis of the wire at an acute angle, the other planar portion commonly being perpendicular to the wire axis; the planar portion(s) adjacent the cutting edge(s) arranged at an acute angle to the wire axis are herein termed "bevel surface(s)."

After the blade cutting edges are moved toward one another to cut at least partially through the insulation, the blades and wire are moved relative to one another in a direction axially of the wire to complete the severing of a slug of insulation and strip it fully or partially from the conductor. The slug may be stripped in one of two ways: 1. the wire may be firmly clamped at a position on the side of the blades opposite the slug to be stripped and the blades, while engaged with the insulation, moved simultaneously in the direction of the slug, or 2. the wire may be grasped mechanically or manually on the side of the blades opposite the slug to be removed and moved axially as the engaged blades remain stationary.

Although blades of the abutting type have been arranged with the planar surface portions adjacent the cutting edges and facing the slug to be stripped disposed at the same angle to the axis of the wire, conventional wisdom dictates that, when employing a pair of overlapping blades, the bevel surfaces face in opposite directions from the surfaces in sliding contact. This is because such an arrangement places the sharp, cutting edges as closely as possible to the same plane, i.e., the planes of the blade surfaces which are in sliding contact. This may be, and normally is, achieved by employing two identically formed blades placed in front-to-rear surface contact with the cutting edges facing in opposite directions. That is, when identical blades are placed side by side, with the cutting edges facing in the same direction, both bevels extend from blade surfaces facing in the same direction. When one blade is turned over onto its opposite surface and turned end-for-end to place the cutting edges in opposed relation, the bevel surfaces are then on opposite sides of the blades, i.e., on the front surface of one blade and the rear surface of the other.

When overlapping blades with cutting edges in opposed notches are used to cut the insulation on wires of various diameters, the cuts are necessarily incomplete. For example, when a pair of V-shaped cutting edges are employed, the insulation will be cut from four, linear sides, and since the wire is round in cross section and cannot be contacted by the blades, portions of the insulation will remain uncut, assuming neither the blades nor the wire is rotated. Severing of the insulation is completed by relative movement of the blades and the wire in one of the two previously described ways. A slug of insulation is thus severed and moved axially on the wire to be stripped either fully or partly, depending on the distance of blade travel, from the free end of the wire.

When such apparatus, having overlapping, non-rotating blades, is used to cut partially through the insulation and complete the severing thereof by moving the blades to break the uncut portions, the wire is sometimes nicked or scraped by the blades. This problem is generally amplified as the diameter or gauge of the wire increases, with corresponding increase in the axial force exerted by the blades on the slug of insulation being stripped. With common types of insulation, the problem of nicking, etc., requiring scrapping of the wire, is most prevalent in wires of 10 gauge or larger. However, when severing insulation or other coating materials having relatively high tensile strengths, the problem may also arise with smaller gauge wires.

The principal object of the present invention is to provide apparatus and methods utilizing overlapping blades to cut partially through one or more layers of coating material on a filamentary member and severing the material by relative movement of the engaged cutting blades and the member in a manner which greatly reduces or eliminates the tendency of the blades to nick or score the member during the severing and/or stripping operation.

Another object is to provide apparatus for and methods of severing and stripping insulation from an electrical wire, or the like, including configuring and relatively positioning a pair of overlapping blades in a novel manner to improve operation and reduce scrap.

Other objects will in part be obvious and will in part appear hereinafter.

SUMMARY OF THE INVENTION

The present invention is based upon recognition of the source of the aforementioned problem as related to the angular force exerted by the surface portions of the blades adjacent the cutting edges on the wire as the insulation is being severed. In conventional arrangements of blades of the overlapping type, the surface portion of one blade which engages the insulation and faces in the direction of the slug being severed is perpendicular, while the bevel surface of the other blade facing in the same direction is angularly disposed, with respect to the axis of the wire. Hence, a component of the severing force applied by the bevel surface to the insulation is in the direction of the other blade; when this force component, which increases commensurately with the tensile strength of the insulation being severed, becomes great enough the wire is pushed against and damaged by the sharp edge of the other blade.

The present invention essentially eliminates the aforementioned problem, while retaining the advantages associated with overlapping blades, by positioning the bevels forming the blade cutting edges to equalize the force components exerted on the wire as the insulation is severed by movement of the engaged blades axially of the wire. In a first embodiment, the cutting edges of both blades are formed at the junction of a plane surface and a bevel surface, and the blades are positioned with the planar surfaces of each facing in the direction of the portion being severed. In a second embodiment, the blades are formed in the same manner, with the bevels at equal angles to the planar surfaces, and the blades are positioned with the bevels of both blades facing in the direction of the portion being severed. In a third embodiment, the cutting edges of both blades are formed by bevels extending at equal angles from both planar surfaces; that is, bevels on both sides of both blades meet to form the cutting edges, whereby the blades are necessarily positioned with bevels on both blades facing the portion being severed, as well as in the opposite direction. In all embodiments, the cutting edges are formed in notches of V-shape or other appropriate configuration in opposing edges of the overlapping blades.

The foregoing and other features of the invention will be more readily understood and fully appreciated from the following detailed description, taken in conjunction with the accompanying drawings, wherein:

DETAILED DESCRIPTION

Figure 1:
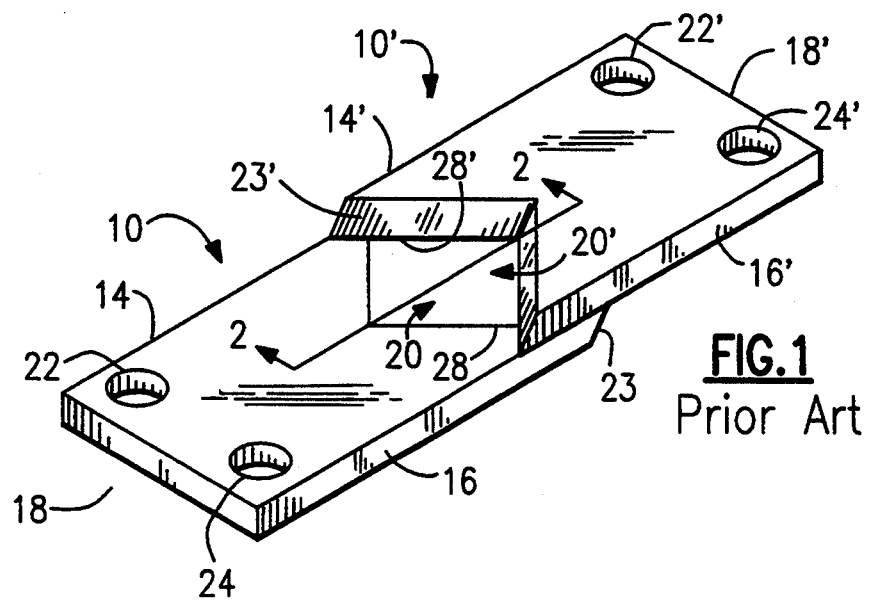
FIG. 1 is a perspective view of a pair of blades of the overlapping type, formed and positioned according to the prior art, for use in insulation cutting and stripping apparatus.
Figure 2:
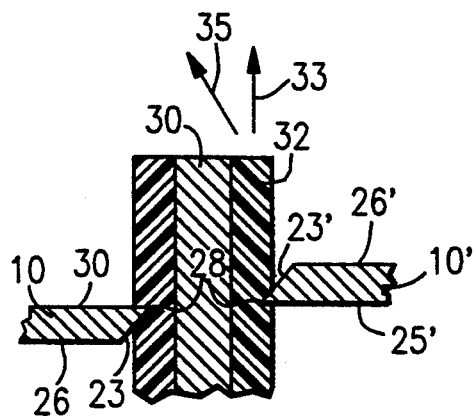
FIG. 2 is a fragmentary, side elevational view in section on the line 2—2 of FIG. 1, also showing an insulated wire positioned between the cutting edges of the blades.

In FIGS. 1 and 2 are shown a pair of identical blades 10 and 10', formed and positioned in accordance with the prior art, and so labeled, for cutting partially through one of more layers of coating material on a filamentary member, and then severing the material by movement of the engaged blades relative to and axially of the member. Blade 10 is formed with side edges 14 and 16 parallel to one another and perpendicular to outer edge 18, and an inner edge configured as an essentially V-shaped notch 20. Likewise, blade 10' includes parallel side edges 14' and 16', perpendicular outer edge 18' and V-shaped notch 20' at its inner edge. Each of blades 10 and 10' includes a pair of openings 22, 24 and 22', 24' adjacent outer edges 18, 18', respectively, for passage of screws mounting the blades upon conventional moveable support means.

The thickness of blades 10 and 10' is adequate to provide the degree of rigidity necessary for the intended application of the blades. As previously indicated and discussed in more detail hereinafter, the blades are mounted and moved in a cooperative manner to make radial cuts in a layer of insulating material, or the like, on a filamentary member such as an electrical conductor. The cuts made by the blades, due to the linear and circular configurations of the blade cutting edges and the conductor, respectively, pass partially but not completely through the insulation. Severing is completed by relative movement of the blades and the conductor, e.g., by moving the blades in unison axially of the insulated conductor in a direction away from a position where the insulated conductor is securely clamped. Thus, the blades must be rigid enough to withstand the forces imposed thereon as severing of the insulation is completed by movement of the blades axially of the insulated conductor. This will be a function not only of the material and dimensions of the blades, but also the tensile strength and cross-sectional area of the insulation or other coating material to be severed and its adherence to the conductor or other underlying layer.

The sharp cutting edges are provided in the usual manner along the inner edges of each of blades 10 and 10' i.e., in V-shaped notches 20 and 20'. A planar bevel surface meets one of the opposite, planar blade surfaces at an acute angle, providing the sharp cutting edge, and the other at an obtuse angle. In the prior art arrangement of FIGS. 1, 2 and 2a, bevel surface 23 meets opposite, planar surfaces 25 and 26 of blade 10 at acute and obtuse angles, respectively, forming sharp cutting edge 28 along both sides of notch 20. Likewise, cutting edge 28' is formed at the juncture of bevel surface 23' and planar surface 25' of blade 10', the bevel surface meeting planar surface 26' at an obtuse angle.

Figure 2A:
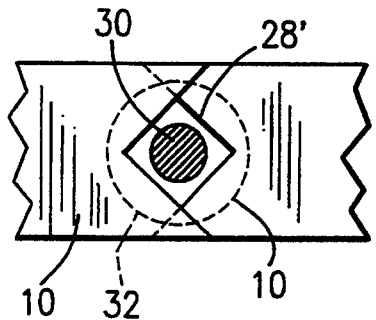
FIG. 2a is a fragmentary, front elevational view as seen from the line 2a—2a of FIG. 2.

Blades 10 and 10' are mounted on any conventional support structure (not shown) with bevels 23 and 23' facing in opposite directions. It will be noted that this is accomplished with two identically formed blades, with one blade turned over, placing surfaces 25 and 25' in overlapping contact and notches 20, 20' in opposing relation. Cutting edges 28, 28' are thus in essentially the same plane when blades 10, 10' are in overlapping relation with surfaces 25, 25' in sliding engagement. As shown in FIGS. 2 and 2a, blades 10, 10' have been moved to bring the two sides of each of cutting edges 28, 28' into closely spaced relation to conductor 30, passing partially through insulation 32. For greater clarity of the features under consideration, the size of conductor 30 and insulation 32 relative to blades 10 and 10' has been exaggerated as compared to typical wires operated upon by such blades.

As blades 10, 10' are moved in unison in the direction of arrow 33 (FIG. 2) to complete severing of the insulation, the severing force is applied to the portion of the insulation to be stripped (the upper portion in FIG. 2) by planar surface 25 and bevel surface 23'. If severing and stripping were effected by moving the conductor in an axial direction opposite to arrow 33 while maintaining the blades stationary, the force would still be applied by the same surfaces 25 and 23'. In any case, with blades formed and positioned as dictated by the prior art severing forces are applied to the insulation with one of the force-applying surfaces normal to the direction of relative blade and conductor movement, and the other at an acute angle. Thus, as the blades are moved in the direction of arrow 33, a component of the force applied to insulation 32 will be in the direction of arrow 35 (normal to bevel surface 23'), thereby urging conductor 30 in the direction of cutting edge 28.

Figure 3:
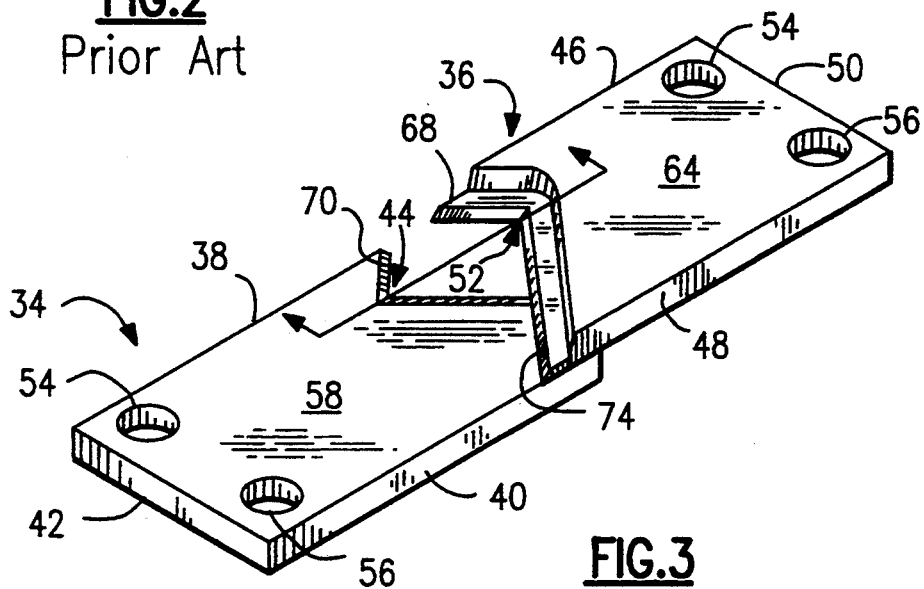
FIG. 3 perspective view of a pair of blades formed and positioned according to a first embodiment of the present invention.
Figure 4:
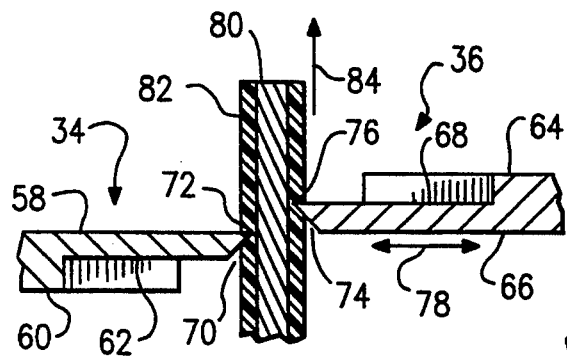
FIG. 4 is a fragmentary, elevational view in section on the line 4—4 of FIG. 3, also showing an insulated wire positioned between the cutting edges of the blades.

Turning now to the illustrated embodiments of the present invention, in FIGS. 3 and 4 are shown a pair of blades 34 and 36 which are formed and arranged to have bevels facing in the same direction when the blades are placed in front-to-rear surface contact with the cutting edges opposed. Blade 34 includes side edges 38 and 40, parallel to one another and perpendicular to outer edge 42, with V-shaped notch 44 on the inner edge. Likewise, blade 36 has side edges 46 and 48, outer edge 50 and V-shaped notch 52. Both blades have a pair of openings 54 and 56 for mounting purposes.

As with some blades of the prior art, blades 34 and 36 include portions of reduced thickness adjacent their inner edges. This configuration is sometimes used in blades intended for relatively heavy duty applications, i.e., when the layers to be severed by the blades are relatively thick and/or of high tensile strength. Thus, in addition to opposite, planar, parallel surfaces 58 and 60, blade 34 has intermediate planar surface 62, and blade 36, in addition to planar surfaces 64 and 66, has intermediate planar surface 68. Intermediate planar surfaces 62 and 68 are, of course, parallel to outer surfaces 58 and 60, and 64 and 66, respectively.

Bevel surface 70 meets planar, parallel surfaces 58 and 62 at acute and obtuse angles, respectively, forming sharp cutting edge 72 along V-shaped notch 44 of blade 34. Bevel surface 74 is formed along notch 52 of blade 36 to meet surface 68 at an acute angle and surface 66 at an obtuse angle, providing cutting edge 76. Blades 34 and 36 are supported with notches 44 and 52, and thus cutting edges 72 and 76, opposing one another, and with surfaces 58 and 66 in the same plane; thus, portions of surfaces 58 and 66 are in sliding engagement as the blades are reciprocally moved in the directions of arrows 78, in the course of the cutting operation.

After blades 34 and 36 are moved to bring portions of cutting edges 72 and 76 into close proximity to conductor 80, thereby passing partially through insulation layer 82, as shown in FIG. 4, the blades are moved in unison in the direction of arrow 84. The insulated conductor is clamped firmly on the side of the blades opposite the direction of blade movement, thereby completing severing of the insulating layer at the position of the cuts. The severing force applied to the portion of insulation to be stripped by the blades is by planar surfaces 58 and 68, i.e., the portions of the blades adjoining the cutting edges which face in the direction of severing movement of the blades, both of which are at the same angle (90°) to the axis of conductor 80.

Figure 5:
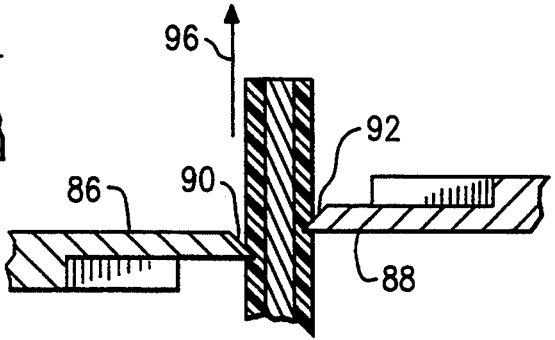
FIGS. 5 and 6 fragmentary, elevational, sectional views, as in FIG. 4, showing blades formed and positioned according to second and third embodiments of the invention.

In the embodiment of FIG. 5, overlapping blades 86 and 88 have bevel surfaces 90 and 92, respectively, adjoining the cutting edges. Insulating layer 94, after being partially cut, is severed by movement of blades 86 and 88 in unison in the direction of arrow 96. The severing force is thus applied to the portion of insulating layer 94 to be stripped by bevel surfaces 90 and 92 which both face in the direction of blade movement (i.e., to the axis of conductor 97) and are disposed at equal angles (e.g., 45°) thereto.

Figure 6:
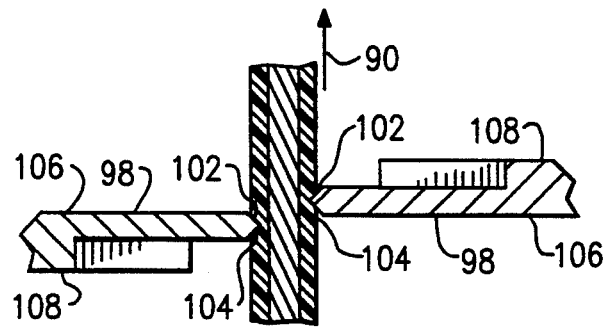

Blades 98 and 98' of the FIG. 6 embodiment have cutting edges formed by the juncture of bevels on both sides, whereby the two blades may be identical. Bevel surfaces 102 and 104 extend from a common juncture at the cutting edge to opposite, parallel surfaces 106 and 108, respectively, of blade 98. Likewise, bevels 102' and 104' meet one another to form a sharp cutting edge, and adjoin parallel surfaces 106' and 108' respectively, at obtuse angles in blade 98'. Thus, regardless of the direction of relative movement of the blades and conductor to sever partially cut insulation 110, the surfaces which apply the severing force are disposed at the same angle with respect to the axis of the conductor.

Figure 7:
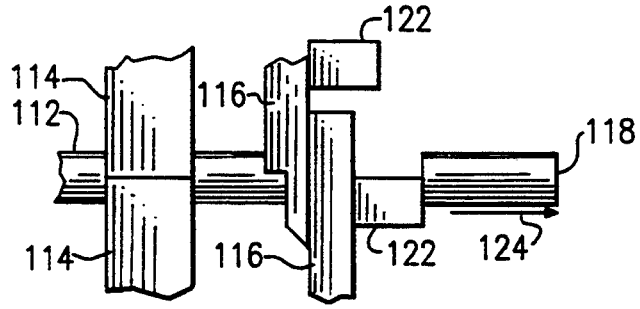
FIGS. 7 and 8 are diagrammatic, plan views of cutting and stripping apparatus illustrating the manner of operation of the invention.
Figure 8:
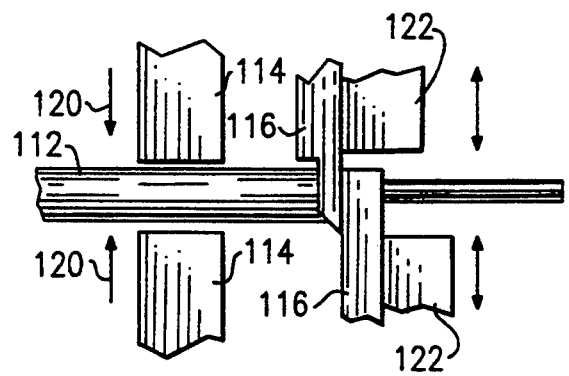

Means for clamping or otherwise restraining axial movement of the insulated conductor, as well as means for mounting and moving the blades are well known in many forms in the prior art. For purposes of the present invention, any conventional clamping means and support and movement means for overlapping blades may be used, whereby such elements are shown entirely diagrammatically in FIGS. 7 and 8. Insulated conductor 112 is inserted axially between spaced clamping jaws 114 and blades 116, as shown in FIG. 7. Jaws 114 are then moved toward one another, in the directions indicated by arrows 120 in FIG. 7, to firmly engage the insulated conductor therebetween, as shown in FIG. 8. Blade support means 122, upon which blades 116 are fixedly mounted, are moved in the directions of arrows 118, to the position of FIG. 8, wherein the blade cutting edges make partial radial cuts through the insulating layer and are in close proximity to the conductor. The depth of cut is controlled by any of a number of well-known means. The blade supports and engaged blades are then moved in the direction of arrow 124 to complete the severing of the insulation and strip the severed slug fully or partially from the end portion of the conductor.

It should be noted, as previously suggested, that rather than clamping the conductor and moving the blades in a direction away from the clamping means, i.e., toward the portion of insulation to be fully or partially stripped, the conductor may be moved axially in the opposite direction, i.e., away from the portion to be stripped. In either case, the forces applied by the blades to the portion to be stripped as such portion is severed from the remainder of the insulation are at equal angles to the direction of relative blade/conductor movement, i.e., to the axis of the conductor. Experimental data indicates that the best and most consistent performance is achieved when the blade surfaces which apply the severing force to the insulation are at equal, acute angles to the axis of the conductor, as in FIG. 5, which represents the preferred embodiment. Making the planar surface portions immediately adjacent the cutting edges of the blades which apply the axial severing and stripping force to the slug of insulation at equal angles to the axis of relative blade/conductor movement in overlapping blades means, of course, that the cutting edges of the two blades are moved radially of the conductor in parallel planes which are axially spaced with respect to the conductor.

What is claimed is:

1. In apparatus for severing a layer of material covering a filamentary member and moving a severed portion of said material axially upon said filamentary member by means of a pair of blades arranged in overlapping relation and having respective cutting edges relatively moveable in a linear direction perpendicular to the axis of said filamentary member positioned between said edges, each of said edges being formed at the juncture of a forwardly and a rearwardly disposed, planar surface of each of said blades adjacent cutting edges, the improvement wherein:

said forwardly disposed surface of each of said blades is in a plane at the same angle to said axis, and said cutting edges are disposed in planes perpendicular to said axis which are longitudinally spaced along said axis.

2. The invention according to claim 1 wherein said same angle is an acute angle.

3. The invention according to claim 2 wherein said same angle is substantially 90°.

4. The invention according to claim 1 wherein said cutting edges of each of said blades form substantially V-shaped notches.

5. The invention according to claim 1 wherein said blades are of equal thickness and said longitudinally spaced planes are spaced by said thickness.

6. The invention according to claim 1 wherein said rearwardly disposed surface of each of said blades is in a plane at the same angle to said axis.

7. Apparatus for severing a layer of material coaxially surrounding an elongated member and for moving a portion of the severed material axially upon the elongated member, said apparatus comprising:

a) a first blade having front and rear surfaces and a first cutting edge at the juncture of first and second, planar surfaces;

b) a second blade having front and rear surfaces and a second cutting edge at the juncture of third and fourth, planar surfaces;

c) means for mounting said blades in overlapping relation with portions of said first blade front surface and said second blade rear surface in mutual contact;

d) means for effecting relative, linear movement of said blades with said portions of said first blade front surface and said second blade rear surface remaining in mutual, sliding contact between first and second positions wherein said first and second cutting edges are spaced by respective first and second distances in a direction parallel to said linear movement;

e) said first and second cutting edges moving in first and second planes during said linear movement of said blades, said first and second planes being spaced by a predetermined distance in a direction perpendicular to said linear movement; and f) said first and third planar surfaces being disposed adjacent the respective front and rear surfaces of said first and second blades and at first, equal angles to said perpendicular direction.

8. The invention according to claim 7 wherein said first angles are acute angles.

9. The invention according to claim 7 wherein said first angles are 90°.

10. The invention according to claim 7 wherein said second and fourth planar surfaces are disposed adjacent the respective rear and front surfaces of said first and second blades and are at second equal angles to said perpendicular direction.

11. The invention according to claim 10 wherein said first angles are acute angles and said second angles are 90°.

12. The invention according to claim 10 wherein both said first and second angles are acute angles.

13. The invention according to claim 7 wherein said blades are of equal thickness and said predetermined distance is equal to said thickness.

14. Cutting and severing apparatus including a pair of blades for cooperative use in cutting partially through a layer of coating material on an elongated, filamentary member and moving axially of the member to sever the material, said apparatus comprising:

a) a first blade having first front and rear surfaces, first left and right sides extending between first inner and outer ends, and predetermined thickness, said first inner end having a substantially V-shaped first notch intermediate of said first left and right sides with the edges of said first notch bisected by a first axis, and a first cutting edge formed by a first bevel extending from said first front surface along said first notch edges outwardly toward said first rear surface and said first outer end;

b) a second blade having second front and rear surfaces, and second left and right sides extending between second inner and outer ends, said second inner end having a substantially V-shaped second notch intermediate of said second left and right sides with the edges of said second notch bisected by a second axis, and a second cutting edge formed by a second bevel extending from said second front surface along said second notch outwardly toward said second rear surface and said second outer end;

c) first means for supporting said blades with said first and second axes coaxial, said first rear surface in contact with said second front surface, and said apexes of said first and second notches spaced from one another along said axes;

d) second means for reciprocally moving said blades simultaneously in opposite directions parallel to said axes, thereby moving said apexes toward and away from one another with said first rear surface in sliding contact with said second front surface; and e) third means for reciprocally moving said blades simultaneously in the same direction perpendicular to said axes, whereby a coating layer on a filamentary member inserted between said first and second notches is partially cut by said first and second cutting edges upon movement of said first and second apexes toward one another with the positions of the cuts made by said first and second cutting edges axially spaced along said member by a distance equal to said predetermined thickness, and said material is severed at the position of the cut upon movement of said blades by said third means with said member held in an axially fixed position.

15. The invention according to claim 14 wherein the thickness of each of said blades is reduced in portions bordering said first and second notches, said bordering portions forming first and second intermediate surfaces of said first and second blades, respectively, said first and second front, rear and intermediate surfaces all lying in planes parallel to one another, said first bevel extending between said first front and intermediate surfaces, and said second bevel extending between said second rear and intermediate surfaces.

16. The invention according to claim 15 wherein said first and second intermediate surfaces are substantially midway between said first front and rear surfaces and said second front and rear surfaces, respectively.

17. The invention according to claim 14 wherein said first and second notches extend fully between said first left and right sides and said second left and right sides, respectively.

18. The invention according to claim 14 wherein said first and second blades have first and second, coextensive, longitudinal centerlines, respectively, and said first and second axes are laterally spaced from said centerlines.

19. Apparatus for severing a slug of coating material from a layer of said material surrounding a filamentary member, said apparatus comprising:

a) a first blade having a first cutting edge formed at the juncture of a pair of first, substantially planar surfaces meeting at a first, acute angle;

b) a second blade having a second cutting edge formed at the juncture of a pair of second, substantially planar surfaces meeting at a second, acute angle;

c) first support means for holding said blades in respective, predetermined orientations with opposing surface portions of said blades in overlapping mutually contacting relation and said cutting edges in parallel, spaced planes;

d) second support means for securely holding said filamentary member with its longitudinal axis between opposed portions of said cutting edges and perpendicular to said parallel planes;

e) first means for moving said blades relative to one another to move said opposed portions of said cutting edges toward one another to cut partially through said coating material while maintaining said opposing surface portions in mutual, sliding contact;

f) second means for simultaneously moving said blades in the same linear direction, parallel to said longitudinal direction and away from said second support means, thereby severing said slug; and g) the ones of each of said pairs of first and second surfaces disposed toward said linear direction lying in planes at third, equal angles to said linear direction.

20. The invention according to claim 19 wherein said third angles are substantially 90°.

21. The invention according to claim 19 wherein said third angles are acute angles.

22. The invention according to claim 19 wherein the others of each of said pairs of first and second surfaces disposed oppositely to said linear direction lie in planes at fourth, equal angles to said linear direction.

23. The invention according to claim 22 wherein said third angles are 90° and said fourth angles are acute angles.

24. The invention according to claim 22 wherein said third angles are acute angles and said fourth angles are 90°.

25. The invention according to claim 22 wherein said third and fourth angles are each acute angles.

26. The method of severing a layer of coating material surrounding a coated, elongated member at a predetermined position and moving a portion of said material on one side of said predetermined position axially upon said member, said method comprising:

a) forming a first blade having a front and a rear surface and a first cutting edge at the juncture of first and second, planar surface portions;

b) forming a second blade having a front and a rear surface and a second cutting edge at the juncture of third and fourth, planar surface portions;

c) positioning said blades with portions of said first blade front surface and said second blade rear surface in mutual contact, and portions of said first and second cutting edges in spaced, opposed relation;

d) positioning said coated, elongated member between said portions of said cutting edges;

e) effecting relative movement of said first and second blades to cause said first and second cutting edges to cut partially through said coating material at said predetermined position;

f) effecting relative movement of said blades and said elongated member in a direction axially of said member to sever said material at said predetermined position and to move said portion of said material axially on said member by force applied to said portion of said material by said first and third planar surface portions each of which is disposed at the same, predetermined angle to said direction.

27. The method of claim 26 wherein said elongated member is an electrical conductor and said coating material is an electrically insulating material.

28. The method of claim 26 wherein said relative movement of said first and second blades is effected by simultaneous movement of both of said blades in opposite directions.

29. The method of claim 26 wherein said relative movement of said blades and said elongated member is effected by holding said member stationary and moving said blades simultaneously in the same direction.

30. The method of severing a layer of coating material at a predetermined axial position on a filamentary member and stripping a portion of said material at least partially from said member, said method comprising:

a) forming a pair of blades each having front and rear, parallel planar surfaces and a cutting edge formed at the juncture of planar, forwardly and rearwardly disposed surface portions;

b) mounting said blades in overlapping relation with portions of said cutting edges in opposed relation, portions of said front surface of one blade and said rear surface of the other blade in mutual contact, whereby all of said front and rear surfaces are in parallel planes, and said forwardly disposed surface portions of both of said blades disposed at the same angle to said parallel planes;

c) positioning said member between said portions of said cutting edges with the axis of said member perpendicular to said parallel planes;

d) effecting relative movement of said blades in a direction perpendicular to said axis, with portions of said one blade front surface and said other blade rear surface in sliding contact, to a position wherein each of said cutting edges passes partially through and engages said coating layer and is spaced from said member; and e) effecting relative movement of said blades in a direction parallel to said axis and such that an axial force is exerted by said forwardly disposed surfaces on the portion of said coating material in contact therewith, thereby severing said material and moving a portion thereof axially on said member.

31. The method of claim 30 wherein said same angle is an acute angle.

32. The method of claim 30 wherein said same angle is 90°.

33. The method of claim 30 wherein said rearwardly disposed surface portions of both of said blades are disposed at equal angles to said parallel planes.

34. The method of claim 33 wherein said same angle is an acute angle and said equal angles are 90°.

35. The method of claim 33 wherein said same angle is 90° and said equal angles are acute angles.

36. The method of claim 33 wherein both said same angle and said equal angles are acute angles.

* * * * *